(12) United States Patent
Misumi et al.

(10) Patent No.: US 7,248,790 B2
(45) Date of Patent: Jul. 24, 2007

(54) HEATING DEVICE FOR VEHICLE

(75) Inventors: Haruki Misumi, Kariya (JP); Akio Matsuoka, Takahama (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/236,749

(22) Filed: Sep. 27, 2005

(65) Prior Publication Data

US 2006/0078318 A1    Apr. 13, 2006

(30) Foreign Application Priority Data

Sep. 28, 2004   (JP) ............................. 2004-282271
Jul. 4, 2005    (JP) ............................. 2005-195539

(51) Int. Cl.
*F21V 7/00*    (2006.01)
*B60L 1/02*    (2006.01)

(52) U.S. Cl. ...................... 392/420; 219/202
(58) Field of Classification Search ................ 392/420, 392/421, 419, 422, 407; 219/202; *F21V 7/00*
See application file for complete search history.

(56) References Cited

U.S. PATENT DOCUMENTS

| | | | | |
|---|---|---|---|---|
| 4,723,070 A | * | 2/1988 | Sikora et al. ................ | 219/535 |
| 4,813,470 A | * | 3/1989 | Chiang ..................... | 164/122.1 |
| 5,660,752 A | * | 8/1997 | Vilzmann ................... | 219/553 |
| 5,721,805 A | * | 2/1998 | Cook et al. ................. | 392/411 |
| 5,741,531 A | * | 4/1998 | Kowalski et al. ............ | 425/144 |
| 6,125,658 A | * | 10/2000 | Maugendre et al. ........ | 65/135.6 |
| 6,157,004 A | * | 12/2000 | Bizzio ........................ | 219/390 |
| 6,370,327 B1 | * | 4/2002 | Seguy et al. ................. | 392/407 |
| 7,003,217 B2 | * | 2/2006 | Bachinski et al. .......... | 392/411 |

FOREIGN PATENT DOCUMENTS

| | | |
|---|---|---|
| JP | 7-119988 | 5/1995 |
| JP | U-3078539 | 4/2001 |

* cited by examiner

*Primary Examiner*—Daniel Robinson
(74) *Attorney, Agent, or Firm*—Harness, Dickey & Pierce, PLC

(57) ABSTRACT

A heating device for a vehicle is provided with a radiation-heat generating unit for generating radiation heat, a first light-distributing unit for converting irradiation directions of the radiation heat into a substantial single irradiation direction, and a second light-distributing unit for distributing the radiation heat to at least one heating object in a passenger compartment of the vehicle. The second light-distributing unit slantways intersects the radiation heat which has the substantial single irradiation direction converted by the first light-distributing unit.

20 Claims, 3 Drawing Sheets

HEATING DEVICE FOR VEHICLE

CROSS REFERENCE TO RELATED APPLICATION

This application is based on Japanese Patent Applications No. 2005-195539 filed on Jul. 4, 2005 and No. 2004-282271 filed on Sep. 28, 2004, the disclosure of which is incorporated herein by reference.

FIELD OF THE INVENTION

The present invention relates to a heating device for a vehicle. The heating device is suitably used for a heating in a passenger compartment of the vehicle by radiation heat, which is generated by a halogen lamp, an infrared lamp or the like.

BACKGROUND OF THE INVENTION

Generally, in an air conditioner for a vehicle, cooling water which cools an engine of the vehicle to become warm water is circulated through a heating heat exchanger. In the heating heat exchanger, warm water is used as a heat source to heat air, which will be introduced into a passenger compartment of the vehicle to temperature-condition it. In this case, heating of air introduced into the passenger compartment may be insufficient before the temperature of cooling water in the engine is heightened, thus deteriorating a heating capacity of the air conditioner. For example, in a hybrid vehicle or a vehicle having a high-efficiency traveling engine, it is difficult for engine cooling water to supply a sufficient heat amount to a heating operation of the air conditioner.

Therefore, in addition to engine cooling water, another heat source is to be used for a quick-acting heating in the passenger compartment. A quick-acting heating can be provided by a home-used heating device which has a similar construction to a home-used electric fan, for example, referring to JP-U-3078539. The heating device has a halogen lamp (instead of fans and motor) for emitting infrared rays. The halogen lamp is provided with a concave reflector which is big-sized, so that heat of the infrared rays is transferred in a facing direction of the reflection plate to heat the passenger compartment.

However, in this case, the home-used heating device (halogen heater) is too big when being mounted in the vehicle. On the other hand, if the halogen heater is small-sized, the density of the infrared rays from the halogen heater will be heightened to be dangerous.

Because the power of the halogen lamp which is mounted in the vehicle is to be restricted, a sufficient heating sense cannot be provided for the passenger if the irradiation range of the halogen lamp is enlarged. On the other hand, if the infrared rays are converged at a single zone in order to improve the heating sense, a cold/hot difference between the zone and other zones (without being irradiated with infrared rays) will be amplified to deteriorate the comfort.

Moreover, smell may be generated because dust accumulated at a high-temperature portion of the halogen heater is burned, for example, in an initially winter-use of the halogen heater which has not been used in summer.

SUMMARY OF THE INVENTION

In view of the above-described disadvantage, it is an object of the present invention to provide a heating device for a safe and comfortable heating in a passenger compartment of a vehicle. The heating device supplies the quick-acting heating by radiation heat.

According to the present invention, a heating device for a vehicle is provided with a radiation-heat generating unit for generating radiation heat, a first light-distributing unit for converting irradiation directions of the radiation heat into a substantial single irradiation direction, and a second light-distributing unit for distributing the radiation heat to at least one heating object in a passenger compartment of the vehicle. The second light-distributing unit slantways intersects the radiation heat which has the substantial single irradiation direction converted by the first light-distributing unit.

Therefore, the heat-radiating part of the heating device can be compacted, thus improving a mounting performance thereof in the vehicle. The radiation heat (infrared rays) having been converged to become parallel rays will be reflected toward the heating object by the second light-distributing unit which slantways intersects the infrared rays, without being directly thrown at the heating object. Thus, the optical path width of the infrared rays is enlarged, and the energy density thereof is reduced. Therefore, a passenger in the passenger compartment can be provided with a safe heating, even when being directly heated.

Moreover, in this case, the radiation heat is converged to have the substantially single irradiation direction. Therefore, the radiation heat can be efficiently transferred even when the radiation-heat generating unit is constructed of a compacted halogen lamp or the like having a small power, while the irradiation area of the heating object is enlarged due to a diffusion of the irradiation in an appropriate range so that the comfort of the passenger can be bettered.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

A heating device for a vehicle according to a first embodiment of the present invention will be described with reference to FIG. 1. The heating device is suitably used to heat at least one heating object (e.g., passenger feet) in a passenger compartment of the vehicle by radiation heat.

Figure 1:
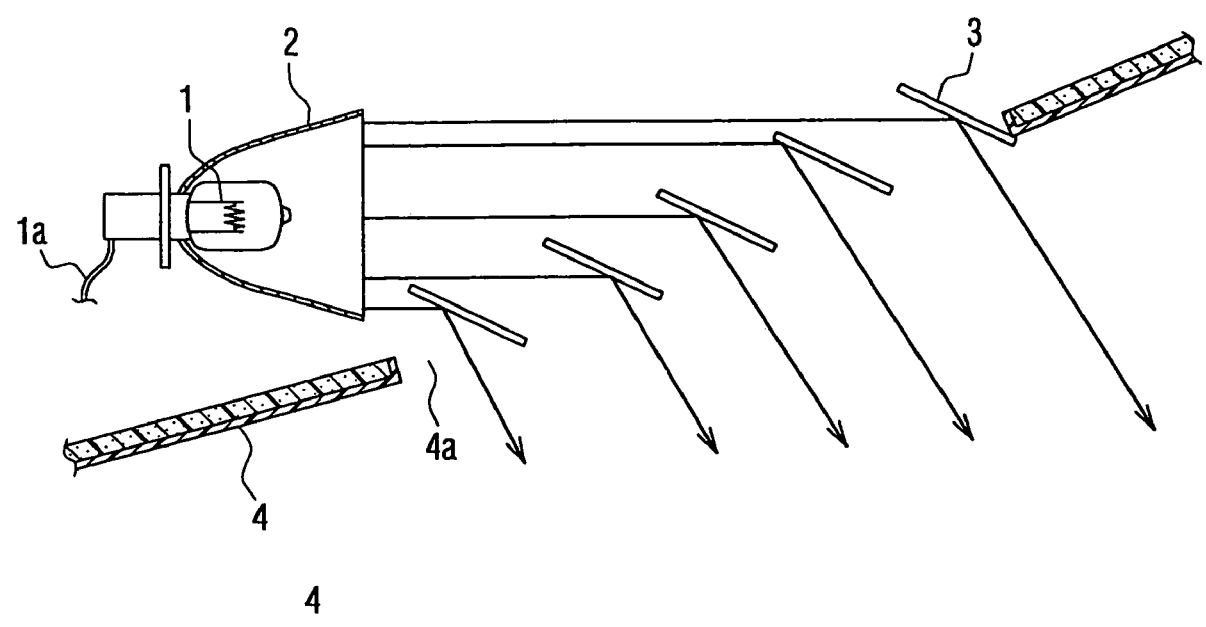
FIG. 1 is a schematic sectional view showing a vehicle heating device according to a first embodiment of the present invention.

As shown in FIG. 1, a radiation-heat irradiating port 4a can be formed at a lower portion of an instrument panel 4 of the vehicle and face the passenger feet. A first light-distributing unit 2 (e.g., reflector) is disposed inside the instrument panel 4. A radiation-heat generating unit 1 (e.g., halogen lamp or infrared lamp) is arranged at the substantial center of the reflector 2. The halogen lamp 1, for example, is power-supplied through a lead line 1a to radiate infrared rays (radiation heat). The infrared rays emitted by the halogen lamp 1 are reflected and converged by the reflector 2 (having parabolic cross section, for example), to have a substantial single irradiation direction. That is, the infrared rays are converted into substantially parallel rays.

A second light-distributing unit 3 can be constructed of multiple (e.g., five) reflectors 3, which are disposed at the radiation-heat irradiating port 4a and arranged substantially parallel to each other. A gap is arranged between the adjacent reflectors 3, and set without allowing an entrance of passenger fingers.

The reflector 3 having, for example, a plate shape slantways intersects the infrared rays which are emitted by the halogen lamp 1 and converged by the reflector 2. In this case, each of the reflectors 3 has a reflection surface to reflect the infrared rays.

Thus, the substantially parallel infrared rays thrown at the plate-shaped reflector 3 will be reflected toward the passenger feet (heating object) through the gaps, each of which is arranged between the adjacent reflectors 3. Each of the reflectors 2 and 3 can be made of a metal or a heat-resistant resin. The reflection surface of each of the reflectors 2 and 3 is mirror-finished, and thereafter provided with a metal (e.g., aluminum, gold and copper) which has a large reflection coefficient to the infrared rays and is evaporated onto the reflection surface.

When the halogen lamp 1 is energized, the infrared rays will be radiated. The infrared rays are reflected and converged by the parabolic reflector 2 to be converted into the parallel rays. The parallel rays are thrown at the plate-shaped reflector 3, which are arranged at the radiation-heat irradiating port 4a and obliquely intersects the parallel rays. The infrared rays are reflected by the plate-shaped reflectors 3 toward the heating object (e.g., passenger feet) through the gaps between the reflectors 3, thus heating the heating object.

According to this embodiment, the heating device is used for a heating in the passenger compartment of the vehicle by the radiation heat generated by the halogen lamp 1 or the like. As described above, the heating device is provided with the halogen lamp 1 for generating the radiation heat, the parabolic reflector 2 through which the radiation heat generated by the halogen lamp 1 is converged to have the substantially single irradiation direction, and the plate-shaped reflectors 3 which intersect the parallel rays (radiation heat) from the halogen lamp 1 and the parabolic reflector 2 to distribute the radiation heat toward the heating object.

In this case, for example, the parabolic reflector 2 is disposed inside the instrument panel 4 at the upper side of the feet of the passenger sitting in the passenger compartment. The halogen lamp 1 is arranged at the substantial center of the parabolic reflector 2. The plate-shaped reflectors 3 are arranged at the radiation-heat irradiating port 4a, which is the opening formed at the instrument panel 4 at the side of the passenger compartment. The plate-shaped reflectors 3 are arranged to intersect the infrared rays (having substantially single irradiation direction), which are emitted by the halogen lamp 1 to provide the radiation heat.

In this case, the heat-radiating portion of the heating device is compacted, thus improving the mounting performance thereof at the vehicle. Moreover, the infrared rays which are converged to become the parallel rays are reflected by the plate-shaped reflectors 3 toward the heating object. That is, the heating object is not directly irradiated with the infrared rays. In this case, the plate-shaped reflectors 3 are tilted with respect to the parallel rays. The optical path width of the infrared rays is enlarged, thus decreasing the energy density of the infrared rays. Thus, a safe heating can be provided for the passenger even when the passenger is directly irradiated with the infrared rays. Moreover, because the heat-radiating portion (having high temperature in heat radiation) is apart from the passenger, it is difficult for the passenger to contact the heat-radiating portion.

Furthermore, the halogen lamp or the like having a small power is used to construct the compacted heat-radiating portion. The radiation heat is converged to have the substantially same irradiation direction to be efficiently transferred, while being diffused in an appropriate range to enlarge the irradiation area of the heating object. Thus, a heating comfort of the passenger can be improved.

Furthermore, the irradiation of the infrared rays is aimed at the heating object by the reflection of the plate-shaped reflectors 3. Thus, the irradiation heat amount per area of the heating object can be reduced, in the case where the total irradiation heat amount provided for the heating object is the substantially same with that of a conventional halogen heater. Accordingly, the energy density of the infrared rays through the radiation-heat irradiating port 4a can be reduced, thus providing a safer heating.

The second light-distributing unit is constructed of the multiple plate-shaped reflectors 3 which are arranged parallel to each other. Thus, the infrared rays can be diffused in the appropriate range, so that the irradiation area of the heating object can be enlarged. Moreover, it is difficult for the passenger hands to contact the high-temperature portion of the heating device.

In this embodiment, the radiation-heat generating unit 1 can be constructed of the halogen lamp, the infrared lamp or the like to provide the infrared rays for the heating by the radiation heat.

The heating object of the heating device can be the passenger feet, so that the passenger is provided with a quick-acting and comfortable heating. Moreover, the sight of the driver in night or the like will not be influenced, because the feet thereof are irradiated with the infrared rays.

In this case, the halogen lamp 1 and the parabola reflector 2 are arranged inside the instrument panel 4 at the upper side of the passenger feet, without contacting the passenger hands. The plate-shaped reflectors 3 are disposed at the radiation-heat irradiating port 4a which is the opening of the instrument panel 4. Therefore, the safe heating can be provided.

Second Embodiment

Figure 2:
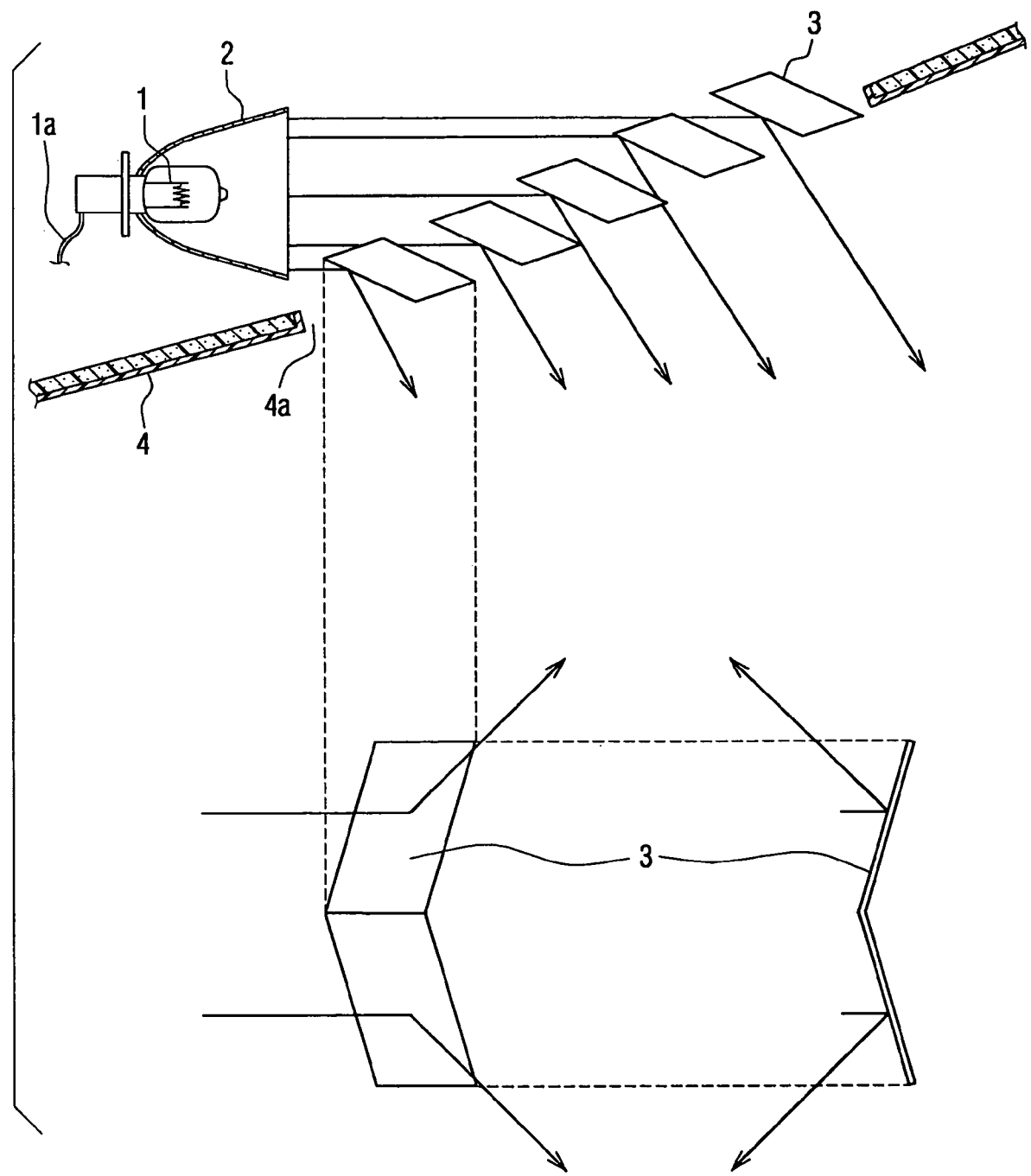
FIG. 2 is a schematic sectional view showing a vehicle heating device according to a second embodiment of the present invention.

According to a second embodiment of the present invention, each of the reflectors 3 is constructed of a bent plate to have multiple reflection surfaces with respect to the radiation heat (infrared rays) emitted by the radiation-heat generating unit 1, so that multiple heating objects can be irradiated with the infrared rays. For example, referring to FIG. 2, each of the reflectors 3 is constructed of a plate which is bent at the substantial center thereof to have a substantial '<' shape. Thus, the infrared rays from the heat-radiating portion of the heating device can be reflected to have two irradiation directions. Therefore, for example, the two feet of the passenger can be efficiently heated.

Third Embodiment

Figure 3:
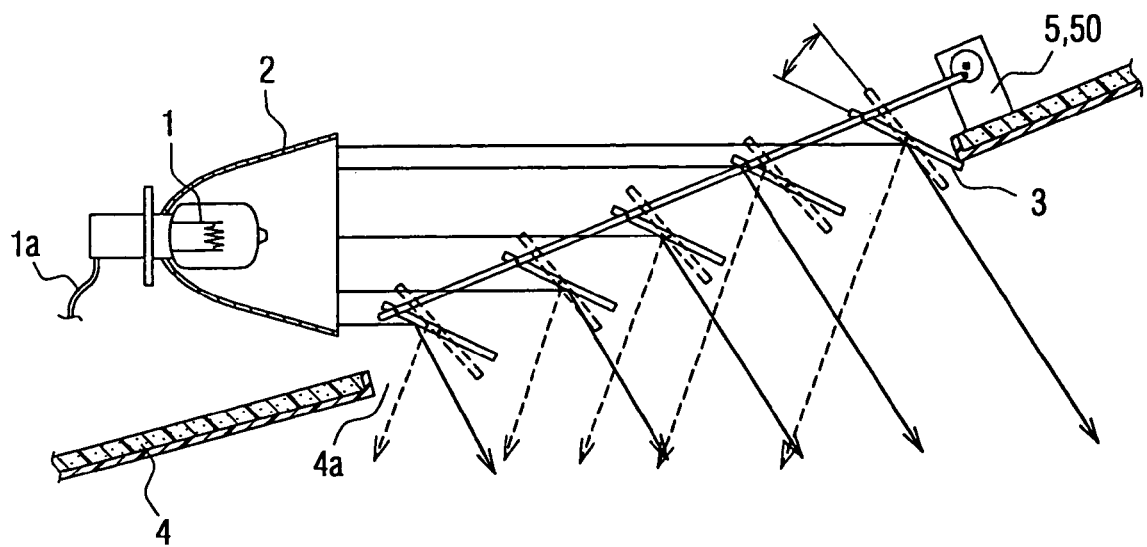
FIG. 3 is a schematic sectional view showing a vehicle heating device according to a third embodiment of the present invention.
Figure 4:
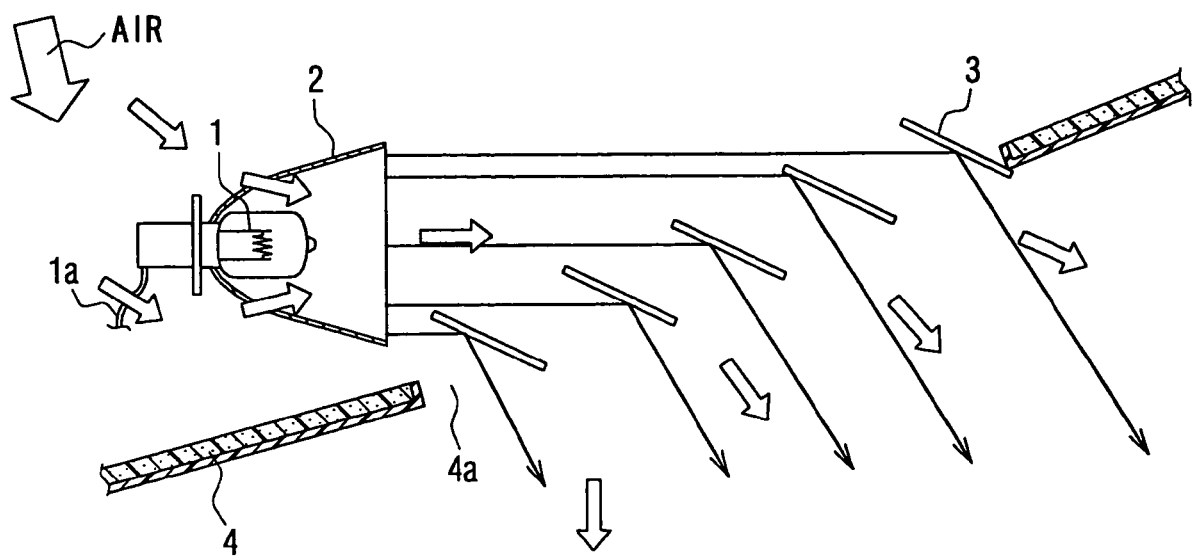
FIG. 4 is a schematic sectional view showing a vehicle heating device according to a fourth embodiment of the present invention.

According to a third embodiment of the present invention, referring to FIG. 3, reflection angles of the reflectors 3 can be adjusted by an angle adjusting apparatus 5. Thus, the irradiation position of the infrared rays can be preferably changed by the passenger. The adjustment of the reflection angle can be manual or motor-driven.

A swing device 50 can be provided to swing the reflectors 3. Thus, the irradiation position of the infrared rays can be adjusted by a swinging of the plate-shaped reflectors 3 to enlarge the irradiation range thereof, while the infrared rays can be converged to some extent to provide a sufficient heating sense for the passenger. The reflector 3 can be swung in one direction (e.g., right-left direction or front-rear direction) or in two directions (e.g., right-left direction and front-rear direction).

Fourth Embodiment

According to a fourth embodiment of the present invention, conditioned air from a vehicle air conditioner is provided for the vicinities of the radiation-heat generating unit 1 (e.g., halogen lamp) and the first light-distributing unit 2 (e.g., parabola reflector). For example, conditioned air from a foot opening of the air conditioner is partially blown toward the neighborhood of the halogen lamp 1 through a foot duct (not shown) for providing warm air for the passenger feet.

That is, conditioned air from an air-blowing duct (e.g., foot duct) of the air conditioner close to the heating device is partially branched to pass the vicinities of the halogen lamp 1 and the parabola reflector 2 and then flows into the passenger compartment. Thus, dust accumulation around the lamp can be reduced because of an air flowing. Therefore, smell can be restricted from occurring due to a burning of dust or the like attached to the high-temperature portion of the heating device. Moreover, conditioned air can cool the vicinity of the lamp, which will have a high temperature due to the heat radiation. Conditioned air having been heated by the high-temperature portion can be also used as warm air for heating the passenger compartment.

Other Embodiment

Although the present invention has been fully described in connection with the preferred embodiments thereof with reference to the accompanying drawings, it is to be noted that various changes and modifications will become apparent to those skilled in the art.

In the above-described embodiments, the halogen lamp or the infrared lamp is used as the radiation-heat generating unit 1. However, other radiation-heat generating source can be also used.

Moreover, in the above-described embodiments, the second light-distributing unit 3 is constructed of the multiple plate-shaped reflectors which are arranged parallel to each other. However, the second light-distributing unit 3 can be also constructed of multiple refractors (e.g., Fresnel lens). The multiple plate-shaped reflectors can be also disposed (or linearly) with different arrangement angles.

Furthermore, in the above-described embodiments, the heating device is arranged close to the passenger feet to heat them. However, the heating device can be also arranged at other positions to heat other heating objects. In this case, the second light-distributing unit 3 can be surface-coated to absorb visible rays and transmit (or reflect) the infrared rays, considering that the visible rays included in the infrared rays generated by the heating device may influence the visibility of the driver.

Such changes and modifications are to be understood as being in the scope of the present invention as defined by the appended claims.

What is claimed is:

1. A heating device for a vehicle, comprising:
   a radiation-heat generating unit for generating radiation heat;
   a first light-distributing unit for converting irradiation directions of the radiation heat into a substantial single irradiation direction; and
   a second light-distributing unit which is arranged in an irradiation path of the radiation heat from the first light-distribution unit and spaced from the first light-distributing unit in the substantial single radiation direction for distributing the radiation heat from the first light-distribution unit to at least one heating object in a passenger compartment of the vehicle, the second light-distributing unit slantways intersecting the radiation heat which has the substantial single irradiation direction converted by the first light-distributing unit.

2. The heating device according to claim 1, wherein the second light-distributing unit is constructed of a plurality of plate-shaped reflectors.

3. The heating device according to claim 2, wherein each of the plate-shaped reflectors has a plurality of reflection surfaces.

4. The heating device according to claim 2, further comprising
   an angle adjusting unit for adjusting a reflection angle of the plate-shaped reflector.

5. The heating device according to claim 2, further comprising
   a swinging unit for swinging the plate-shaped reflectors.

6. The heating device according to claim 1, wherein conditioned air from an air conditioner of the vehicle is provided for vicinities of the radiation-heat generating unit and the first light-distributing unit.

7. The heating device according to claim 1, wherein the radiation-heat generating unit is one of a halogen lamp and an infrared lamp.

8. The heating device according to claim 1, wherein the heating object is passenger feet in the passenger compartment.

9. The heating device according to claim 1, wherein:
   the radiation-heat generating unit and the first light-distributing unit are arranged inside an instrument panel of the vehicle at an upper side of passenger feet; and
   the second light-distributing unit is arranged at a radiation-heat irradiating port which is formed at the instrument panel at a side of the passenger compartment.

10. The heating device according to claim 2, wherein a gap is arranged between the adjacent plate-shaped reflectors and sized without allowing an entrance of passenger fingers.

11. The heating device according to claim 3, wherein each of the plate-shaped reflectors is bent at a substantial center thereof to have a substantial '<' shape.

12. The heating device according to claim 2, wherein the first light-distributing unit is constructed of a parabolic reflector.

13. The heating device according to claim 12, wherein
   each of the parabolic reflector and the plate-shaped reflectors is made of one of a metal and a heat-resistant resin, and has a reflection surface which is mirror-finished and thereafter provided with a metal evaporated thereon, the metal evaporated on the reflection surface having a large reflection coefficient with respect to the radiation heat.

14. The heating device according to claim 2, wherein the plate-shaped reflectors are arrayed linearly.

15. The heating device according to claim 1, wherein substantially all of the radiation heat from the radiation-heat generating unit is directed in the substantial single irradiation direction by the first light-distributing unit.

16. The heating device according to claim 1, wherein substantially all of the radiation heat from the first light-distributing unit is converted into a second irradiation direction by the second light-distributing unit, the second irradiation direction being different from the substantial single irradiation direction converted by the first light-distributing unit.

17. The heating device according to claim 2, wherein substantially all of the radiation heat from the first light-distributing unit is converted into a second irradiation direction by the second light-distributing unit, the second irradiation direction being different from the substantial single irradiation direction converted by the first light-distributing unit.

18. The heating device according to claim 1, wherein the radiation-heat generating unit is a single radiation-heat generating unit.

19. The heating device according to claim 1, wherein the first light-distribution unit is disposed adjacent the radiation-heat generating unit and the second light-distributing unit is spaced from the radiation-heat generating unit.

20. The heating device according to claim 1, wherein the first light-distribution unit is located closer to the heat generating unit than the second light-distribution unit.

* * * * *